US012762636B1

(12) United States Patent
Fedorynski et al.

(10) Patent No.: US 12,762,636 B1
(45) Date of Patent: Oct. 13, 2026

(54) PARTNER TRIP APPLICATION PROGRAMMING INTERFACE

(71) Applicant: WAYMO LLC, Mountain View, CA (US)

(72) Inventors: Pawel Fedorynski, Menlo Park, CA (US); Eric Friedman, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/633,858

(22) Filed: Apr. 12, 2024

Related U.S. Application Data

(63) Continuation of application No. 17/352,456, filed on Jun. 21, 2021, now Pat. No. 11,989,795.

(60) Provisional application No. 63/044,385, filed on Jun. 26, 2020.

(51) Int. Cl.
*G06Q 50/47* (2024.01)
*B60W 60/00* (2020.01)
*G06Q 10/02* (2012.01)
*G06Q 10/0631* (2023.01)
*G06Q 30/04* (2012.01)

(52) U.S. Cl.
CPC ....... *G06Q 50/47* (2024.01); *B60W 60/00253* (2020.02); *G06Q 10/02* (2013.01); *G06Q 10/06315* (2013.01); *B60W 60/00256* (2020.02); *B60W 2556/45* (2020.02); *G06Q 30/04* (2013.01)

(58) Field of Classification Search
USPC .......................................................... 705/13
See application file for complete search history.

(56) References Cited

U.S. PATENT DOCUMENTS 11,361,594 B1 6/2022 Copeland et al.
11,934,988 B1 3/2024 Fedorynski et al.
(Continued)

OTHER PUBLICATIONS

Shelton, Kyle; "How Can Ride-Sharing Companies Partner with Public Transit?"; https://www.govtech.com/transportation/ How-Can-Ride-Sharing-Companies-Partner-with-Public-Transit.html; Sep. 22, 2016. (Year: 2016).*
(Continued)

*Primary Examiner* — Dione N. Simpson
(74) *Attorney, Agent, or Firm* — Botos Churchill IP Law LLP

(57) ABSTRACT

The technology relates to a seamless interface between an autonomous vehicle service provider and one or more ride-sharing or ride-hailing partner companies. An API enables efficient and robust communication with such partner companies for effective rider services and support. The API enables a partner company to determine how quickly an autonomous vehicle from the service provider could pick up a rider from a given location, as well as the cost of the ride. Customers may request rides or modify scheduled trips via an app running on the user's mobile phone or other communication device. The service may allow customers to directly communicate with the ride provider company, and may also allow customers to book or modify rides via interaction with a partner company that works with the ride provider company, either with the same or a different app.

21 Claims, 12 Drawing Sheets

(56) References Cited

U.S. PATENT DOCUMENTS

| | | | | |
|---|---|---|---|---|
| 2011/0288891 | A1* | 11/2011 | Zaid | G06Q 40/08 705/26.4 |
| 2013/0246207 | A1* | 9/2013 | Novak | G06Q 30/0641 705/26.2 |
| 2015/0046187 | A1 | 2/2015 | Johnson et al. | |
| 2016/0320195 | A1* | 11/2016 | Liu | H04W 4/021 |
| 2016/0356615 | A1 | 12/2016 | Arata et al. | |
| 2017/0169622 | A1* | 6/2017 | Marueli | G06Q 10/02 |
| 2017/0270790 | A1 | 9/2017 | Neiger et al. | |
| 2017/0330144 | A1 | 11/2017 | Wakim et al. | |
| 2018/0293687 | A1* | 10/2018 | Hardee | G06Q 10/06315 |
| 2019/0137290 | A1 | 5/2019 | Levy et al. | |
| 2019/0180236 | A1 | 6/2019 | Greenberger et al. | |
| 2019/0196503 | A1* | 6/2019 | Abari | G01C 21/34 |
| 2019/0317526 | A1* | 10/2019 | Goldman | G05D 1/0297 |
| 2019/0325546 | A1* | 10/2019 | Hagestad | G08G 1/202 |
| 2020/0211140 | A1 | 7/2020 | Horton | |
| 2020/0265727 | A1 | 8/2020 | Priest | |
| 2021/0090075 | A1* | 3/2021 | Subbarayan | G06Q 20/127 |

OTHER PUBLICATIONS

Luna, Nancy; "Tech Tracker: DoorDash to deploy self-driving vehicles in San Francisco"; https://www.nrn.com/technology/tech-tracker-doordash-deploy-self-driving-vehicles-san-francisco; Jan. 3, 2019. (Year: 2019).

Kuhrt, Matt , et al., "Ride-hailing companies continue to partner with providers to reduce no-shows, but does it work?", https://www.fiercehealthcare.com/tech/ride-sharing-companies-continue-to-partner-providers-attempting-to-reduce-no-shows; Health Tech; Mar. 2, 2018. (Year: 2018).

Shelton, Kyle , "How Can Ride-Sharing Companies Partner with Public Transit?", Government Technology; https://www.govtech.com/transportation/how-can-ride-sharing-companies-partner-with-public-transit.html; Sep. 22, 2016. (Year: 2016).

* cited by examiner

150

500

520

600

PARTNER TRIP APPLICATION PROGRAMMING INTERFACE

CROSS-REFERENCE TO RELATED APPLICATIONS

This application is a continuation of U.S. patent application Ser. No. 17/352,456, filed Jun. 21, 2021, which claims the benefit of the filing date of U.S. Provisional Patent Application No. 63/044,385, filed Jun. 26, 2020, the entire disclosure of which is incorporated by reference herein.

BACKGROUND

Autonomous or self-driving vehicles, in particular vehicles that do not require a human driver, can be used to transport passengers from one location to another. Such vehicles may operate in a fully autonomous mode without a person providing driving input. In this driving mode, the vehicle may make all of the driving decisions. The vehicles may also operate in a partially autonomous mode, where a human operator is involved in at least some of the driving decisions.

In ridesharing or ride-hailing situations, customers may request transportation using an app on his or her mobile device. The app may allow the customer to indicate a pickup or drop-off location, a time for the pickup or drop-off, etc. In some instances, the app may link the customer directly with the autonomous vehicle service provider. In other instances, a ridesharing or ride-hailing company may partner with the autonomous vehicle service provider. While a person awaiting pickup or a passenger may not be aware of this ridesharing partnership, how rides are scheduled and operated may be quite different from a direct customer interface. This can complicate the process, resulting in missed pickups or scheduling delays, among other problems.

BRIEF SUMMARY

The technology relates to a seamless interface between an autonomous vehicle service provider and one or more ridesharing or ride-hailing partner companies, in order to provide timely, efficient rider services and support. A partner trip application programming interface (API) provides robust features to the ridesharing or ride-hailing partner companies. The API enables a partner company to determine how quickly an autonomous vehicle from the service provider could pick up a rider from a given location, as well as the cost of the ride. This can potentially be accomplished with more reliable real-time information than the partner company could obtain from human drivers for vehicles in their own fleet. The service provider may use the API to manage partner-based trips, either alone or in conjunction with direct customer-scheduled trips. Whichever alternative is employed provides seamless operation to the rider. The API is not limited to partner ridesharing. For instance, according to other aspects of the technology, the API may also be employed with delivery partners (e.g., food, package or bulk cargo delivery), and/or for concierge services (e.g., a hotel or medical provider).

According to one aspect of the technology, a method is provided that includes receiving, by one or more processors of a ride provider system, a query from a partner server system regarding autonomous vehicle availability to service a trip from a pickup location to a destination; evaluating, by the one or more processors of the ride provider system in response to the received query, availability of a set of autonomous vehicles of a fleet of autonomous vehicles; transmitting, by the one or more processors of the ride provider system, a reply indicating the availability for at least one of the set of autonomous vehicles to service the trip; receiving, by the one or more processors of the ride provider system, a request to dispatch an autonomous vehicle for the trip; issuing, by the one or more processors of the ride provider system, a command to a selected autonomous vehicle of the set of autonomous vehicles, the command including trip information including at least a pickup location; and issuing, by the one or more processors of the ride provider system, dispatch information to the partner server system, the dispatch information including identifying information regarding the selected autonomous vehicle and an estimated arrival time at the pickup location.

In one example, receiving the query from the partner server system regarding autonomous vehicle availability to service the trip from the pickup location to the destination occurs in response to a customer pickup request. In another example, receiving the query from the partner server system regarding autonomous vehicle availability to service the trip from the pickup location to the destination occurs prior to receiving to a customer pickup request. In a further example, receiving the query from the partner server system regarding autonomous vehicle availability to service the trip from the pickup location to the destination implements a propose trip plan application programming interface.

Receiving the request to dispatch an autonomous vehicle for the trip may implement a create trip application programming interface. Issuing the dispatch information to the partner server system may implement a get trip application programming interface. An estimate duration to pickup application programming interface may be implemented for at least one of transmitting the reply indicating the availability for at least one of the set of autonomous vehicles to service the trip or issuing the dispatch information to the partner server system. Transmitting the reply indicating the availability for at least one of the set of autonomous vehicles to service the trip may include providing at least one of an alternative pickup location, an alternative destination, or an alternative pickup time.

The method may further comprise executing billing logic to generate a fee estimate for the trip upon receiving the query. The method may further comprise receiving, by the one or more processors of the ride provider system, customer feedback according to a create trip feedback application programming interface. The query to service the trip may be to pick up a customer from the pickup location and transport the customer to the destination. The query to service the trip may be to pick up one or more packages from the pickup location and transport the one or more packages to the destination.

The method may further comprise assigning a non-customer account to the trip, wherein each non-customer account is not associated with an actual customer of the ride provider system. Here, issuing the command to the selected autonomous vehicle may include associating the non-customer account to a customer to be picked up. Issuing the command to the selected autonomous vehicle may include leasing the non-customer account for a period of time encompassing the trip. In this case, the leasing may include assigning the non-customer account to a partner company corresponding to the partner server system.

In one example, the query received from the partner server system implements a propose trip plan application programming interface. Here, evaluating the availability of the set of autonomous vehicles may implement an estimate duration to pickup application programming interface. Transmitting the reply indicating the availability for the at least one autonomous vehicle may implement at least one of the propose trip plan or the estimate duration to pickup application programming interface. Receiving the request to dispatch the autonomous vehicle may implement a create trip application programming interface. And issuing at least one of the command to the selected autonomous vehicle or the dispatch information to the partner server system may implement the create trip application programming interface.

According to another aspect of the technology, a method is provided that includes receiving, by one or more processors of a partner server system, a trip request from a customer regarding a trip from a pickup location to a destination, the partner server system corresponding to a partner company that provides ridesharing or ride-hailing services via a fleet of vehicles configured for operation by human drivers; transmitting, by the one or more processors of the partner server system to a ride provider system, a query regarding autonomous vehicle availability to service the trip, the ride provider system having a fleet of vehicles configured for autonomous operation; receiving, by the one or more processors of the partner server system, a reply indicating availability for at least one of the fleet of vehicles configured for autonomous operation to service the trip; transmitting, by the one or more processors of the partner server system, a request to the ride provider system to dispatch an autonomous vehicle for the trip; receiving, by the one or more processors of the partner server system, dispatch information from the ride provider system, the dispatch information including identifying information regarding a selected autonomous vehicle and an estimated arrival time at the pickup location; and communicating the dispatch information to the customer.

In one example, the method further includes evaluating, by the one or more processors of the partner server system, the trip request from the customer to determine whether the trip can be satisfied by one or more vehicles of the fleet of vehicles of the partner company. In another example, the method also includes the one or more processors of the partner server system negotiating, with the ride provider system, at least one of the pickup location or the destination based on the availability for at least one of the fleet of vehicles configured for autonomous operation to service the trip. And in yet another example, the method includes, before receiving the trip request from the customer, the one or more processors of the partner server system querying the ride provider system regarding one or more possible trips according to a propose trip plan application programming interface.

DETAILED DESCRIPTION

Aspects of the technology involve providing a ridesharing service in which customers can request a self-driving vehicle, which may come with or without a human operator for driving assistance. Customers may request rides or modify scheduled trips via an app running on the user's mobile phone or other communication device. The service may allow customers to directly communicate with the ride provider company that owns or operates a fleet of self-driving vehicles. The service may also allow customers to book or modify rides via interaction with a third party partner company that works with the ride provider company, either with the same or a different app. For instance, the partner company may provide ridesharing or ride-hailing services for a fleet of vehicles operated by human drivers. In one scenario, the autonomous vehicles of the ride provider company's fleet may be used to provide additional coverage in high demand locations or at peak operating times (e.g., rush hour, before or after a concert or sporting event, etc.), or to serve particular areas of interest, which may or may not be served by the partner company's fleet. Such complementary services may provide benefits not only to the collaborating companies but the customers as well, as access to self-driving vehicles can provide more opportunities and more flexibility for pickups and drop-offs.

Example Vehicle Systems

Figure 1A:
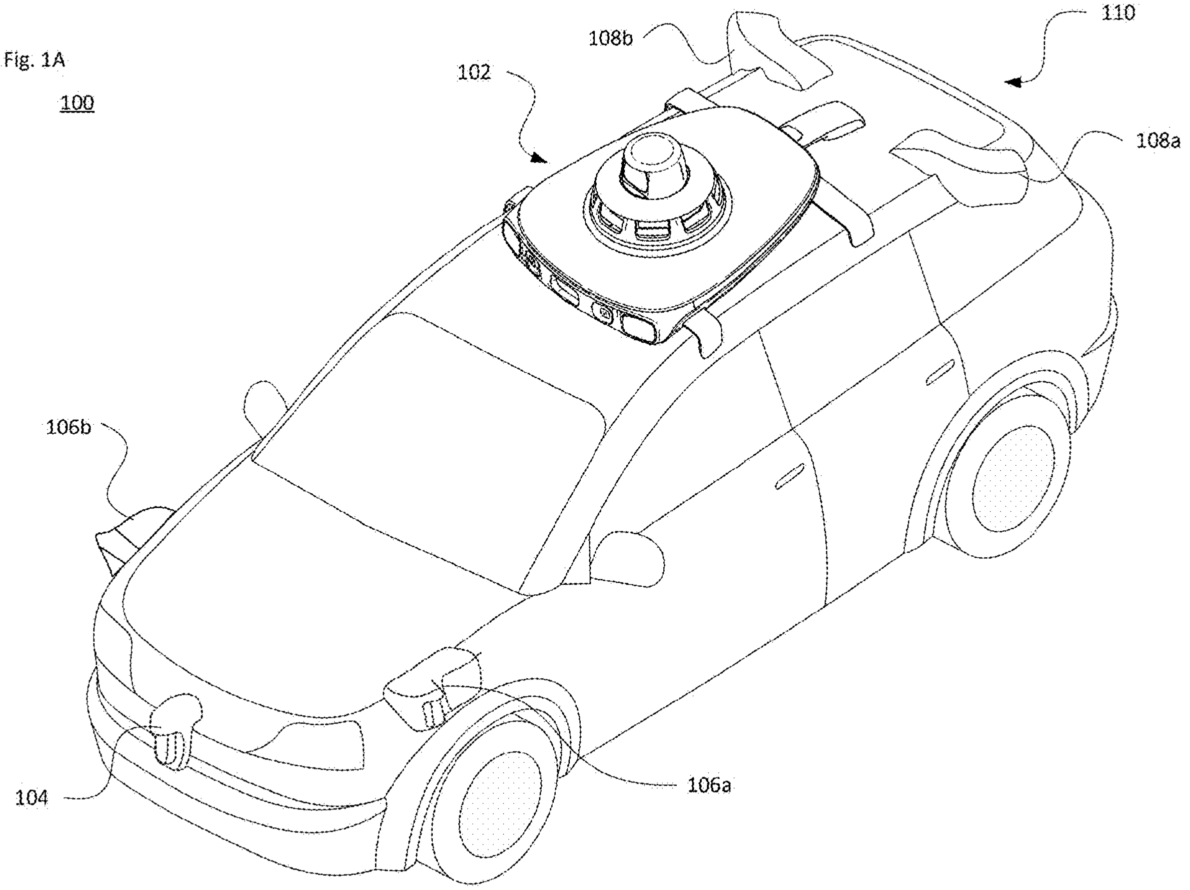
FIGS. 1A-B illustrate example passenger-type vehicles configured for use with aspects of the technology.
Figure 1B:
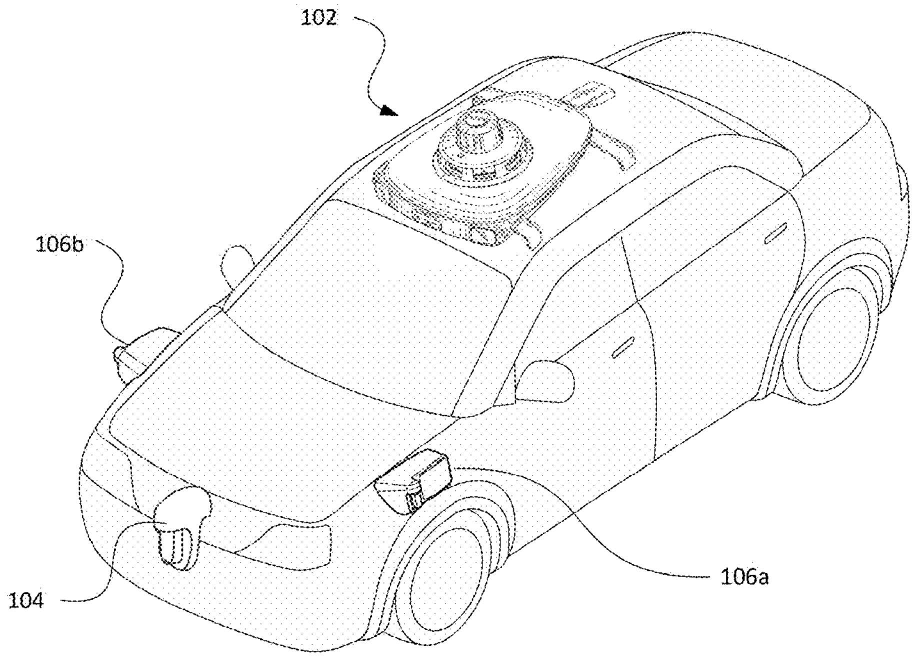

FIG. 1A illustrates a perspective view of an example passenger vehicle 100, such as a minivan or sport utility vehicle (SUV). FIG. 1B illustrates a perspective view of another example passenger vehicle 150, such as a sedan. The passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106*a*, 106*b* on the driver's and passenger's sides of the vehicle may each incorporate lidar, radar, camera and/or other sensors. For example, housing 106*a* may be located in front of the driver's side door along a quarter panel of the vehicle. As shown, the passenger vehicle 100 also includes housings 108*a*, 108*b* for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be different types of vehicles that can transport passengers in an autonomous driving mode, including, but not limited to, cars, buses, motorcycles, trolleys, recreational vehicles, etc., as well as package transport and delivery using cargo trucks, delivery vans, and the like.

While certain aspects of the disclosure may be particularly useful in connection with specific types of vehicles, the vehicle may be different types of vehicle including, but not limited to, sedans, minivans, SUVs, coupes, motorcycles, buses, recreational vehicles, emergency vehicles, cargo vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
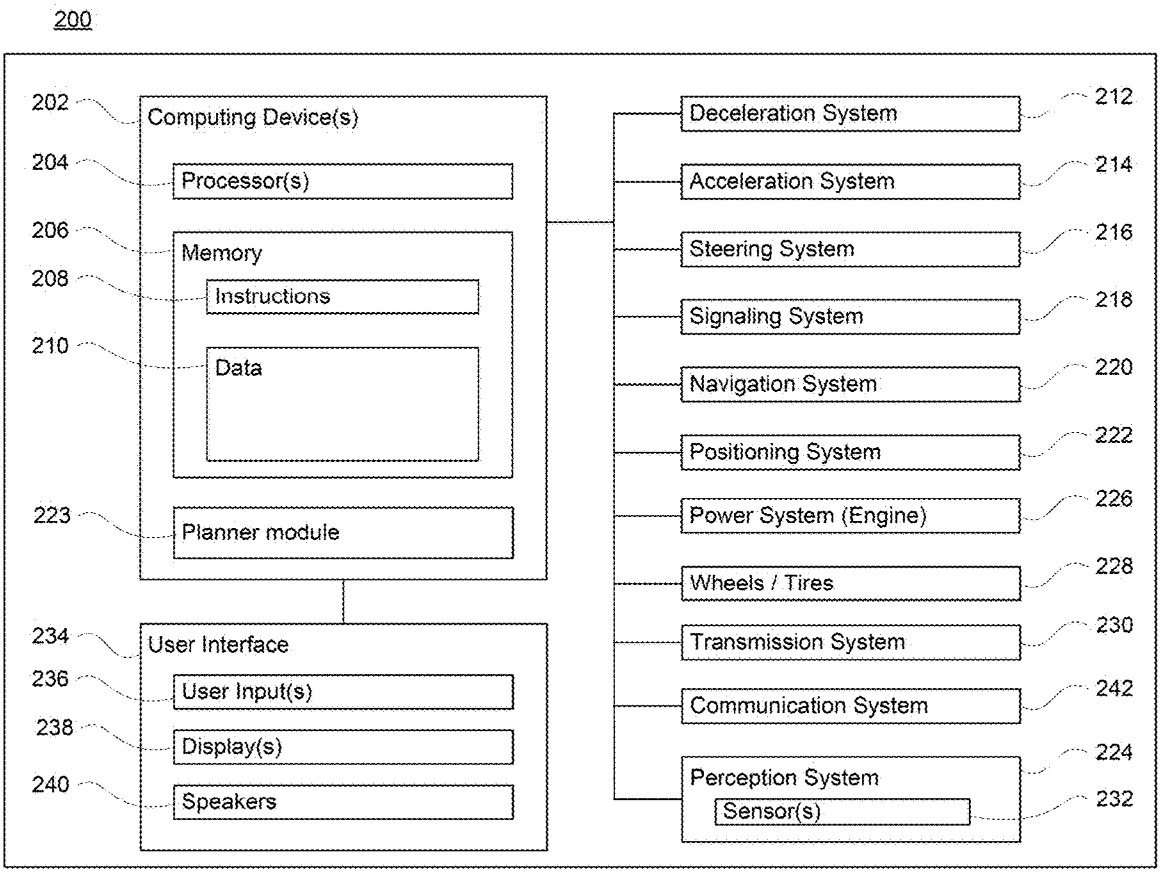
FIG. 2 is a block diagram of systems of an example vehicle in accordance with aspects of the technology.

FIG. 2 illustrates a block diagram 200 with various components and systems of an exemplary vehicle, such as passenger vehicles 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or obtained sensor data, which may be on board the vehicle or remote, depending on the implementation.

The processors 204 may be any conventional processors, such as commercially available central processing units (CPUs) or tensor processing units (TPUs). Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions. By way of example, the planner module 223 may determine a route upon receipt of a request to pickup a rider. The request may be received by the vehicle from a backend system, such as a fleet management system.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode. The computing devices 202 may control the direction and speed of the vehicle, e.g., via the planner module 223, by controlling various components.

By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The sensors 232 are located in one or more sensor units around the vehicle. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc.

The perception system 224 may also include other sensors within the vehicle to detect objects and conditions about or within the vehicle, such as in the passenger compartment. For instance, such sensors may detect, e.g., whether a door is open or closed, the presence of one or more persons, pets, packages, etc. within the vehicle, as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). The interior sensors may detect the proximity, position and/or line of sight of the passengers in relation to one or more display devices of the passenger compartment. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform calibration of individual sensors, all sensors in a particular sensor assembly, or between sensors in different sensor assemblies or other physical housings.

Computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Example Implementations

In view of the structures and configurations described above and illustrated in the figures, various aspects will now be described in accordance with aspects of the technology.

Figure 3A:
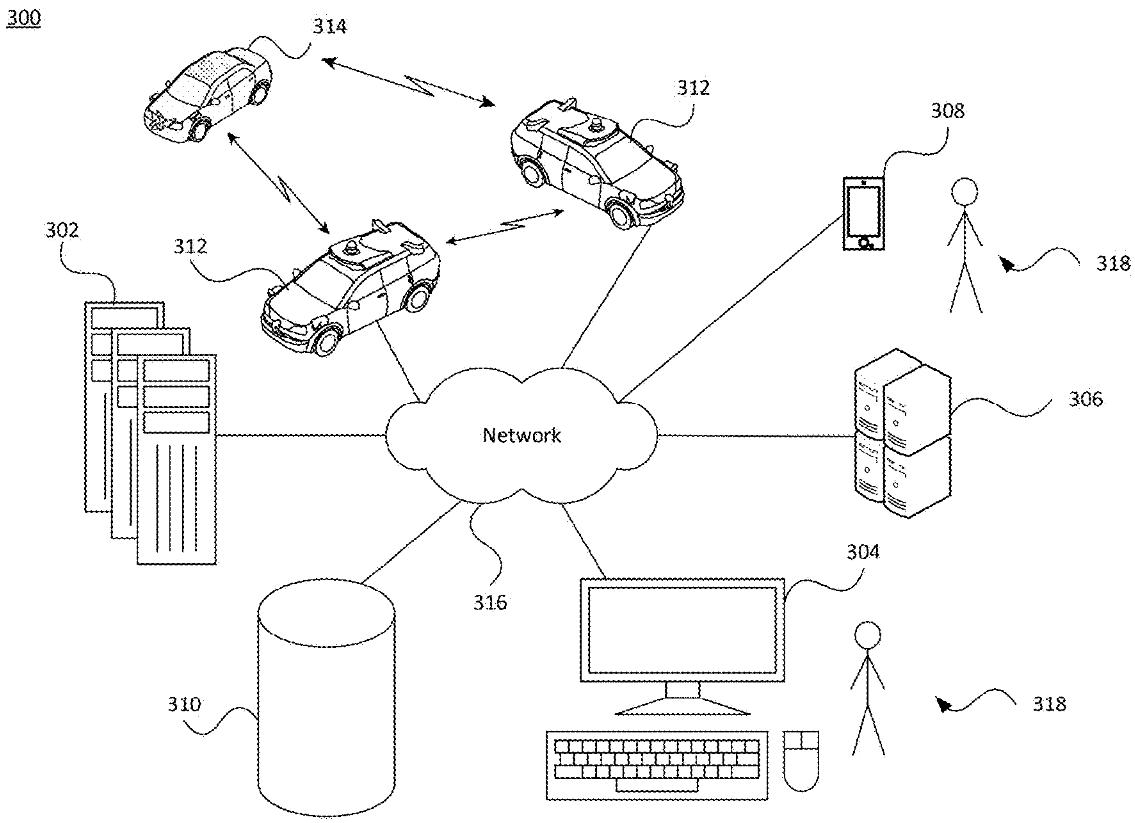
FIGS. 3A-B illustrates an example system in accordance with aspects of the technology.
Figure 3B:
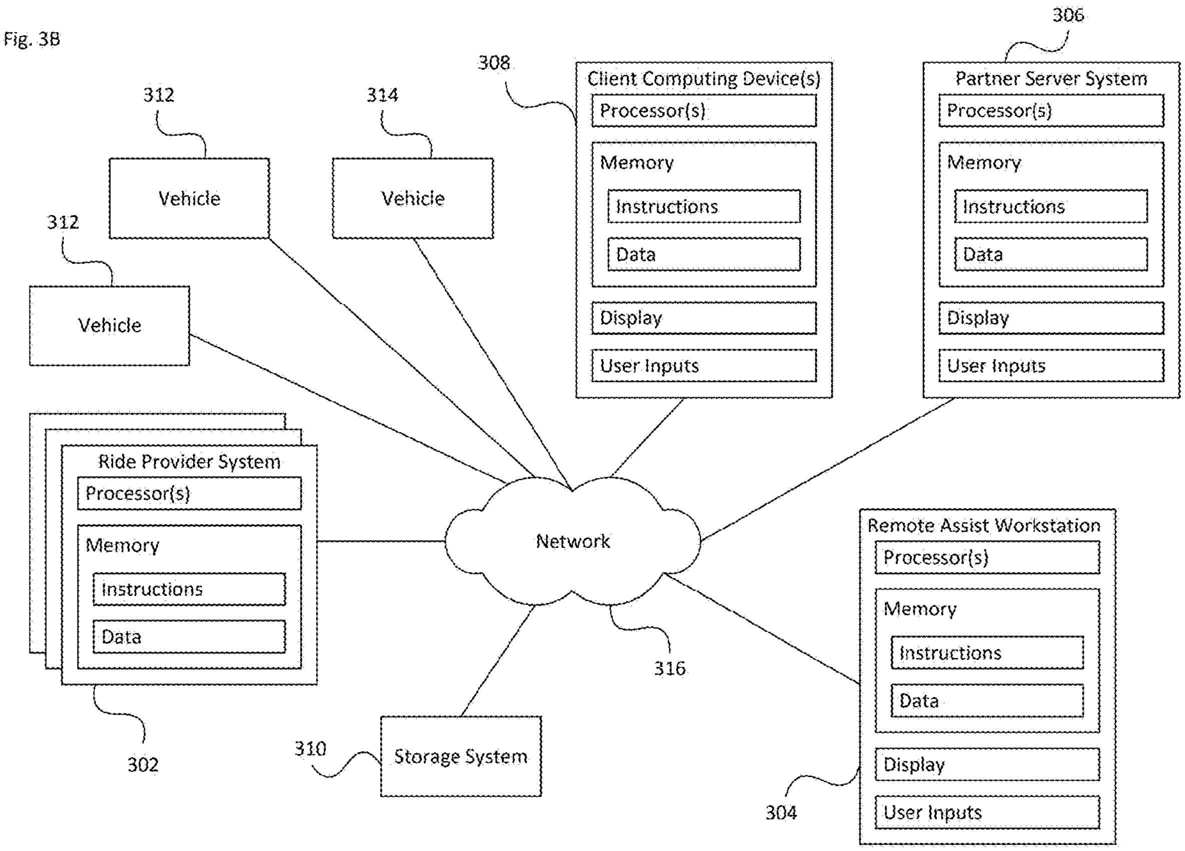

FIGS. 3A-B illustrate general examples of a system for coordinating between customers and autonomous vehicles, such as self-driving vehicles that are part of a fleet of vehicles capable of providing ridesharing services.

In particular, FIGS. 3A and 3B are pictorial and functional diagrams, respectively, of an example system 300 that includes a plurality of computing devices 302, 304, 306, 308 and a storage system 310 connected via a network 316. System 300 also includes vehicles 312 and 314, which may be configured the same as or similarly to vehicles 100 and 150 of FIGS. 1A-B, respectively. Vehicles 312 and 314 may be part of a fleet of autonomous vehicles, which may or may not operate with a driver assistance. Although only a few vehicles and computing devices are depicted for simplicity, a typical system may include significantly more.

As shown in FIG. 3B, each of computing devices 302, 304, 306 and 308 may include one or more processors, memory, data and instructions. Such processors, memories, data and instructions may be configured similarly to the ones described above with regard to FIG. 2. The various computing devices and vehicles may communication via one or more networks, such as network 316. The network 316, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 302 may function as a ride provider system and include one or more server computing devices having a plurality of computing devices, e.g., a load balanced server farm, that exchange information with different nodes of a network for the purpose of receiving, processing and transmitting the data to and from other computing devices. For instance, computing device 302 may include one or more server computing devices that are capable of communicating with the computing devices of vehicles 312 and 314, as well as computing devices 304, 306 and 308 via the network 316. For example, vehicles 312 and 314 may be a part of a fleet of vehicles that can be dispatched by the ride provider system to various locations. In this regard, the computing device 302 may function as a dispatching server computing system which can be used to dispatch vehicles to different locations in order to pick up and drop off passengers or to pick up and deliver cargo. In addition, server computing device 302 may use network 316 to transmit and present information to a user of one of the other computing devices or a passenger of a vehicle.

As shown in FIGS. 3A-B, each computing device 304, 306 and 308 may be a workstation, server system or personal computing device. By way of example, remote assistance workstation 304 and client computing device 308 may each be intended for use by a respective user 318, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The computing devices 304, 306 and/or 308 may also include a camera for recording video streams, speakers, a network interface device, and all of the components used for connecting these elements to one another. In this example, device 308 may be the device of a customer who is either currently in a vehicle 312 or 314, or may be the device of a customer awaiting pickup.

Although the client computing devices may each comprise a full-sized personal computing device, they may alternatively comprise mobile computing devices capable of wirelessly exchanging data with a server over a network such as the Internet. By way of example only, client computing devices 308 may be mobile phones or devices such as a wireless-enabled PDA, a tablet PC, a wearable computing device (e.g., a smartwatch), or a netbook that is capable of obtaining information via the Internet or other networks.

In some examples, computing device 304 may be a remote assistance workstation used by an administrator or operator to communicate with passengers of dispatched vehicles, or users awaiting pickup. Although only a single remote assistance workstation 304 is shown in FIGS. 3A-B, any number of such workstations may be included in a given system. Moreover, although workstation 304 is depicted as a desktop-type computer, the workstation 304 may include various types of personal computing devices such as laptops, netbooks, tablet computers, etc.

Computing device 306 may be, as indicated in FIG. 3B, a partner server system. By way of example, the partner server system may be a computing system managed by a third party ridesharing or ride-hailing service. Thus, according to one aspect the customers using client computing devices 304 may use an app to communicate with the partner server system instead of or in conjunction with communication to the rider provider system. Interaction between these various devices is discussed further below.

Storage system 310 can be of any type of computerized storage capable of storing information accessible by the server computing devices 302, such as a hard-drive, memory card, ROM, RAM, DVD, CD-ROM, flash drive and/or tape drive. In addition, storage system 310 may include a distributed storage system where data is stored on a plurality of different storage devices which may be physically located at the same or different geographic locations. Storage system 310 may be connected to the computing devices via the network 316 as shown in FIGS. 3A-B, and/or may be directly connected to or incorporated into any of the computing devices, such as the ride provider system 302.

In a situation where there are passengers, the vehicle or remote assistance may communicate directly or indirectly with the passengers' client computing device. Here, for example, information may be provided to the passengers regarding current driving operations, changes to the route in response to the situation, etc. Information may be passed from the vehicle to the passenger or other user via the vehicle's user interface subsystem (e.g., 234 of FIG. 2). For instance, when the user is awaiting pickup, the vehicle may send pickup status information via network 316. However, when the vehicle arrives at the pickup location or the customer enters the vehicle, the vehicle may communicate directly with the user's device, e.g., via a Bluetooth™ or NFC communication link.

Figure 4:
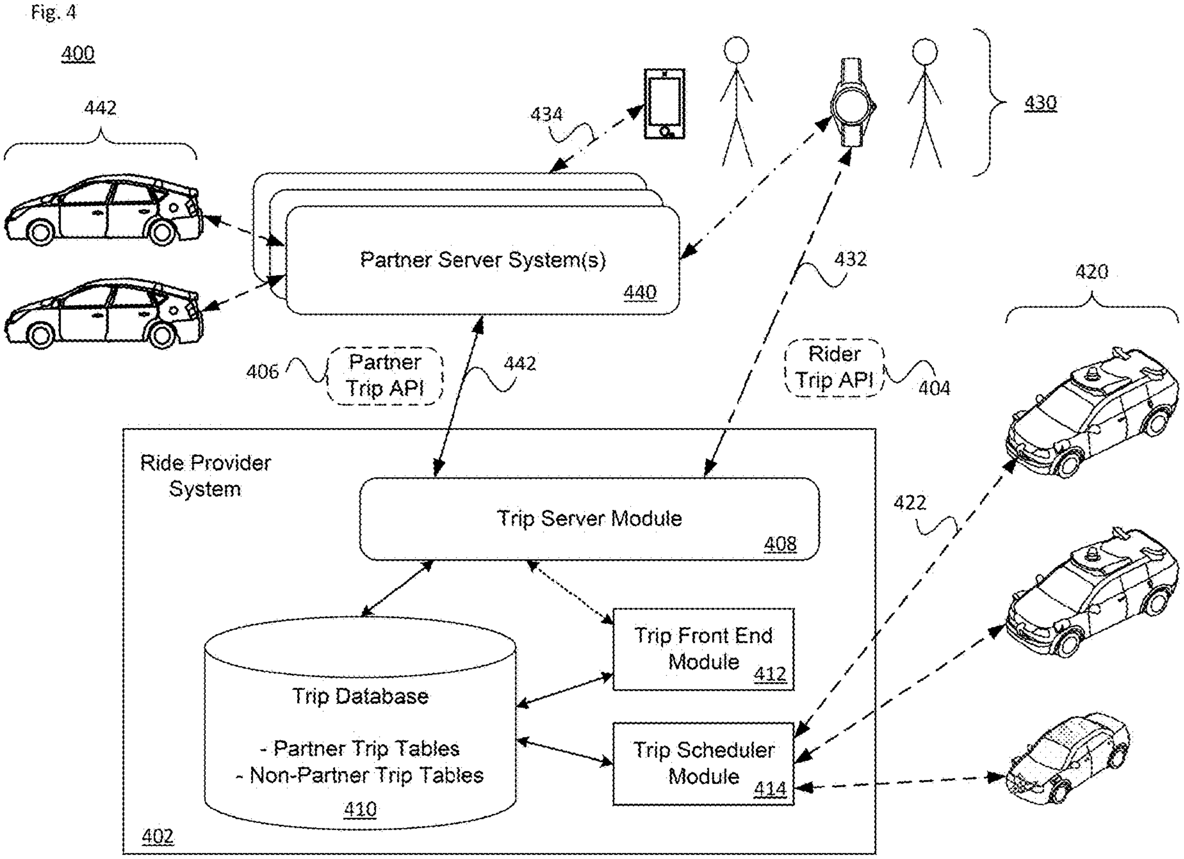
FIG. 4 illustrates an exemplary arrangement in accordance with aspects of the technology.

FIG. 4 illustrates an example arrangement 400 illustrating certain aspects of the system of FIGS. 3A-B. In this example, ride provider system 402 is capable of communicating with a fleet 420 of autonomous vehicles (see dashed lines 422), customers 430 (see elongated dash-dot line 432), and one or more partner server systems 440 (see solid line 442). For instance, the customers 430 may communicate directly with the ride provider system 402 via an app on the customer's mobile device. In this case, a rider trip API 404 may be employed by the ride provide system 402 for communication with and actions involving a given customer.

The customers 430 may also communicate directly with the partner server system 440 (see dash-dot line 434), e.g., using a different app. In this case, the partner server system (s) 440 is configured to coordinate with the ride provider system in order to provide the customer with an autonomous vehicle, or to provide a non-autonomous vehicle 442 driver by a human operator. When the partner server system 440 requests that an autonomous vehicle be deployed, a partner trip API 406 may be used by the ride provide system 402 for direct communication with the partner server system 440 and potentially for indirect communication with the customer 430.

As seen in FIG. 4, the ride provider system 402 may include a trip server module 408. This module may implement the rider trip API 404 and partner trip API 406. A trip database 410 may include one or more partner trip tables for information associated with trips arranged in conjunction with a partner server system 440, as well as one or more non-partner trip tables for information associated with trips arranged directly with customers. In one example, these tables may be distinct. In another example, the tables may be different records or fields in a common or shared database. Other configurations are also possible. The trip database 410 is in operative communication with the trip server module 408. The trip database is also in operative communication with a trip front end module 412 and/or a trip scheduler module 414.

By way of example only, the trip scheduler module 414 may coordinate with the autonomous vehicles of the fleet, while the trip front end module 412 coordinates communication with the trip server module 408. More particularly, the trip front end module 412 is configured to react to a user's (e.g., a customer's or partner's) requests, such as asking to initiate a new trip, or requesting information about the current trip (where the scheduler will find it, see below). In the former case, the trip front end module is configured to record a new trip request in the database. In the latter case, the trip front end module is configured to read the current status of the trip and send it back to the requester. The trip scheduler module is configured to decide which vehicle to assign to which trip, and communicates with the corresponding vehicles to make them serve the trip. The modules of the ride provide system 402 may be processes, routines or programs executed by one or more processors of the system 402. Alternatively, the modules may include the processors themselves (such as a set of TPUs in a distributed processing system).

Figure 5A:
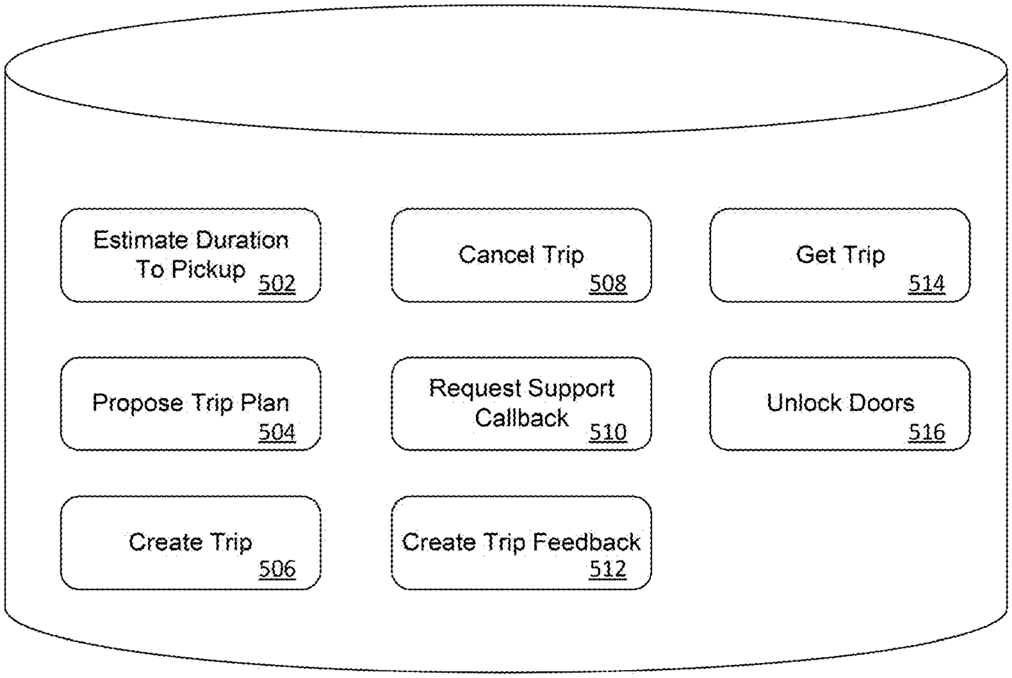
FIG. 5A illustrates an example of different API elements and FIG. 5B illustrates example information input to and returned via the API elements, in accordance with aspects of the technology.
Figure 5B:
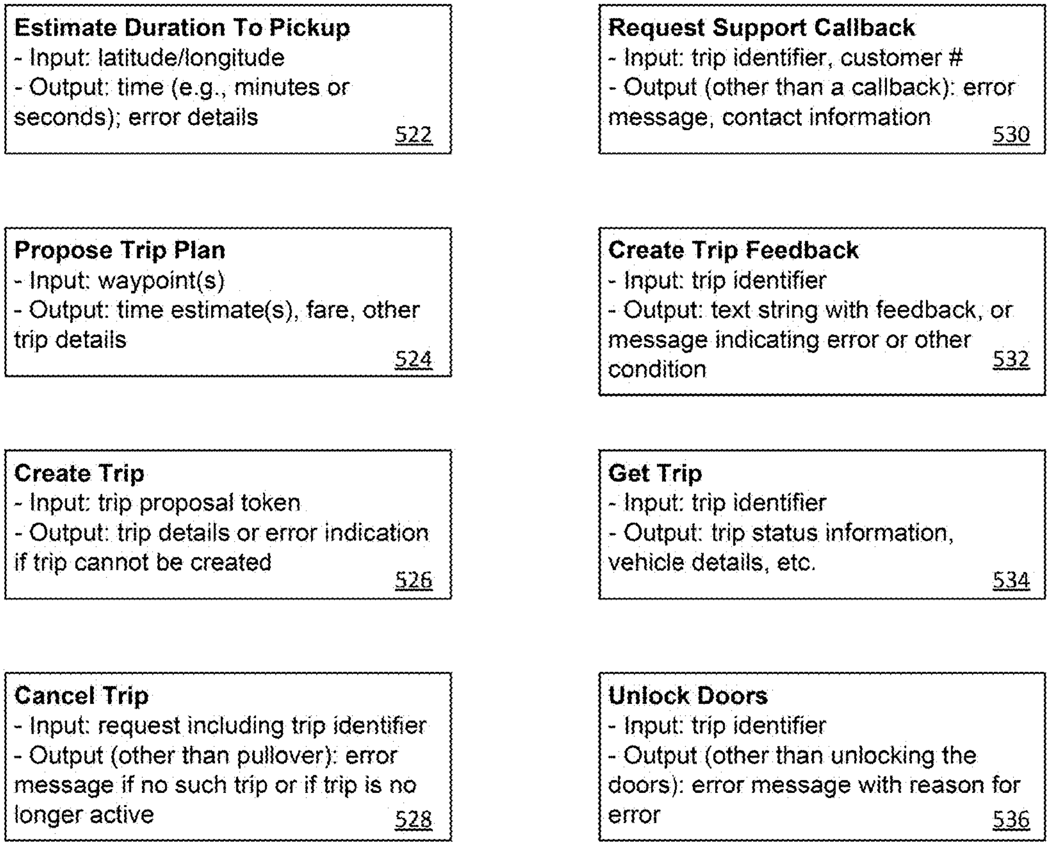

The ride provider system may employ one or both of the rider trip API and the partner trip API during operation. Examples of different API operations are illustrated in view 500 of FIG. 5A, and examples of query and response information are shown in view 520 of FIG. 5B. For instance, the API operations may include estimate duration to pickup 502, propose trip plan 504, create trip 506, cancel trip 508, request callback support 510, create trip feedback 512, get trip 514, and unlock doors 516. This set of API operations is not limiting, and other operations may be included or certain ones omitted, depending upon whether the partner trip API or the rider trip API is being employed.

Estimate duration to pickup 502 is a request for the ride provider system to give an estimate (to the customer or the partner server system) of how long it would take for an autonomous vehicle to get to a pickup point. This information can be provided accurately (e.g., within 2-5 minutes of the actual pickup), because the ride provider system decides which vehicle to dispatch to which customer. As indicated in block 522 of FIG. 5B, the query may include latitude and longitude for the pickup location. The response may be a time in minutes or seconds. Error details can be included in the response, such as no vehicles available, the pickup location is not within the service area, or some other reason why a duration to pickup cannot be estimated.

Propose trip plan 504 is an API for which the ride provider system returns an estimate of how long it would take for a selected autonomous vehicle to get to a pickup point. The propose trip plan 504 allows for negotiations regarding pickup and drop-off spots. Here, proposed waypoints may differ from what the customer originally requested, which can be due to the ability of the autonomous vehicle to reach a particular location, or other considerations that may lead to a more optimal trip. By way of example, if a given street is congested with traffic, is a one-way street, has limited access to a sidewalk, etc., the ride provider system may suggest an alternative pickup or drop-off point. In another example, the ride provider system may negotiate with businesses or municipalities, for instance asking them to mark certain pickup/drop-off spots as reserved for self-driving vehicles. As indicated in block 524 of FIG. 5B, the query for propose trip plan 504 may contain one or two waypoints (e.g., pickup point and drop-off location). If only one waypoint is included, it is assumed to be the pickup point. The response may describe a fare, time estimate(s) and other details for the proposed trip, which may form a trip proposal token.

Create trip 506 is an API call used to actually request a trip. This would follow an earlier propose trip plan. Here, a request for create trip should include a proposal token returned by the propose trip plan. The proposal token is time limited (e.g., within a 5-30 minute window, no longer than 60 minutes, etc.). The service provider (ride provider system) will be bound by the estimate returned in that earlier call. The create trip response includes a trip identifier, aka trip name such as "trips/ABqw93bx02". The trip identifier will be used in all subsequent requests dealing with that trip. As indicated in block 526 of FIG. 5B, the Create Trip call may include a trip proposal token obtained from the result of the propose trip plan 504. The response may include the details of a created trip (including a trip identifier), or an error indication. For instance, if the time limit has expired, a trip already exists for the customer, or some other issue arose, the response can include such information.

Cancel trip 508 is an API call that requests cancellation of a trip. The request contains the trip name (returned by an earlier call to the create trip 506), identifying the trip to cancel. Upon receiving a cancel trip request, the server (e.g., the trip server module of the ride provider system) will communicate with the assigned vehicle (if any) to inform it about the cancellation. In one example, if the vehicle is still on its way to the pickup, it may just abandon the trip immediately, for instance returning to a depot or other service center. However, if the cancellation occurs while the customer is in the vehicle, then vehicle will try to find a suitable spot to pull over and let the customer out. As indicated in block 528 of FIG. 5B, the input is a request for cancellation, which includes a resource name identifying the trip. However, because the request must be sent to the vehicle, and the vehicle may need to pull over to let the customer out, cancellation may not take effect immediately. Thus, the trip status may not update until this happens. An error message may be returned if no such trip exists, or if the trip exists but is no longer active.

Request callback support 510 involves an API call that requests that rider support (e.g., via remote assist workstation 304 of FIG. 3B) should contact the customer. The request should contain the trip name, returned by an earlier create trip query. The request 510 may also contain a phone number to call or other contact information (e.g., email address or social messaging handle). If no phone number or contact information is included, rider support can use the phone number included in or otherwise associated with the original propose trip plan request. As indicated in block 530 of FIG. 5B, the input includes the trip identifier, and may include contact information for the customer (e.g., their phone number). The result may be the customer being contacted by remote assistance. However, if this is not possible for some reason, the output may be an error message with a reason for the error. A phone number, website or other contact information may also be provided in the output so that the customer is able to obtain assistance.

Create trip feedback 512 enables a customer to provide feedback about the trip. This API request may contain the name or other identifier of the trip it talks about, a star rating (e.g., on a scale of 0-5 stars), and optionally a free-form text comment field. As indicated in block 532 of FIG. 5B, the input includes the trip identifier for the particular trip. The output may be a text string with the customer's feedback. If no such trip exists, the trip has not yet been completed or cancelled, or if feedback has already been provided, a message may be returned indicating this.

Get trip 514 is an API query that asks the server (e.g., the trip server module of the ride provider system) to respond with information about a given trip. This API request contains the trip name, returned by an earlier call to the create trip 506. The get trip response will contain information about the trip, such as its status (e.g., REQUESTED/TO_PICKUP (e.g., en route or time until arrival at the pickup location)/AT_PICKUP (e.g., waiting at the pickup location, etc.), the license plate of the dispatched vehicle, and current location of the assigned vehicle (if any), driver information (if there is a driver in the vehicle), ETAs for future waypoints, and for completed trips, the location where the passenger was dropped off. Any or all of this information may be included in the get trip response. As indicated in block 534 of FIG. 5B, the input includes the trip identifier for the particular trip. The output may include trip status information, vehicle details and other information such as listed above.

Unlock doors 516 is an API query that requests the vehicle assigned to the trip to unlock its doors. This would be done once the vehicle has reached the pickup location and the user is ready to board the vehicle. Here, it would typically be up to the requester of this API to decide when the user is "ready to board". This could be the customer himself/herself, or the partner server system. The request will contain the trip name, returned by an earlier create trip response. As indicated in block 536 of FIG. 5B, the input includes the trip identifier for the particular trip. The result may be to unlock the doors. However, if this is not possible because the vehicle is not at the destination or pickup location, if no such trip exists, if the trip is no longer active, or if there is no vehicle assigned to the trip, the output may include an error message indicating this.

Various messages may be associated with these operations. Examples of such messages, for instance which may be passed from the ride provider system to the partner server system or the customer, are below.

The Trip Proposal message provides details about a trip that are likely to be satisfied, for instance as determined by the ride provider system. In one example, the Trip Proposal message would describe a full trip, with both pickup and drop-off waypoints. The information in the Trip Proposal message is valid for a selected timeframe, e.g., 1-5 minutes, or more or less. The Trip Proposal message may also include a proposed fare. Should a trip be created within the selected timeframe, then the proposed fare would be honored.

The Proposed Waypoint message indicates an incremental time that it would take for the autonomous vehicle to get to a proposed waypoint. Here, depending on the location of the pickup or drop-off waypoint, as well as the accessibility of that location to the customer, an additional buffer of time (e.g., 30 seconds to 2 minutes) may be added to the incremental time.

The Trip Plan message should include one or both of the pickup and drop-off location for desired trip.

The Trip message describes the trip. The trip may be scheduled to be taken, currently ongoing, or completed. The trip message contains information about the trip, such as its status (REQUESTED/TO_PICKUP/AT_PICKUP etc.), the license plate and current location of the assigned vehicle (if any), driver information (if present), ETAs for future waypoints, and for completed trips, the location where the passenger was dropped off.

The Trip Status message indicates a current status of the trip. For instance, a trip request may have been accepted by the ride provider system, and the trip may (i) be waiting to be assigned to a vehicle, (ii) have a vehicle assigned to the trip but the vehicle is currently engaged in another trip, (iii) have been accepted by the system but subsequently rejected by the vehicle, (iv) involve the vehicle being en route to the customer, (v) be at the point when the vehicle has already reached the pickup location, but is unable to remain idling at the location and so will move along and/or circle the block to return to the pickup location, (vi) be at the point when the vehicle is at the pickup point and waiting for the customer, (vii) at the point where the customer has not arrived at the pickup location within a determined amount of time (e.g., 3-7 minutes), (viii) in progress with the customer on board, (ix) at the drop-off point but the customer has not disembarked, (x) concluded, or (xi) cancelled).

The Waypoint message includes a location of a particular location, such as a pickup location, drop-off location, or interim stop. It may be, e.g., latitude and longitude coordinates, a location description such as a street address, or a place name such as the name of a store or business.

The Waypoint Status message provides an absolute time at which the vehicle is expected to arrive at a waypoint. Similar to the Trip Status message, the Waypoint Status message can include information about the trip, such as in situations (i)-(xi) described above regarding the trip status.

The Vehicle message may indicate the license plate or other identifying information about a vehicle selected for a particular trip.

The Driver message may be used when a driver is present in the autonomous vehicle. The Driver message may include information about the driver's name, an image of the driver, or the like.

The Route Segment message may include the most recent position of the vehicle, e.g., in latitude and longitude coordinates. It may also include pose or orientation information, such as the yaw of the vehicle. If an assigned vehicle is currently servicing another trip, the Route Segment message may include information about the route segment from the vehicle's current location to either the drop-off of the previous trip or the pickup point for the planned trip.

The Trip Feedback message may include feedback submitted after the completion of a trip. If a trip was cancelled, it may include information explaining the reason why it was cancelled. A customer may be provided with various options so that they may provide trip feedback.

The Partner User message may include a set of information (e.g., name and contact number) for unique association with a given trip. The contact number may be the customer's mobile phone number, to allow the ride provider system to contact the customer during the trip should the need arise.

The Phone Number message may be used with regard to the customer's phone number.

The Polyline message provides a chain of points on the map that approximates the vehicle's predicted route. The precision of the latitude and longitude for the chain of points may be determined based on an evaluation between accuracy and bandwidth available for communication of the message.

Example Scenarios

As noted above, the ride provider system may supply autonomous vehicles directly to customers who request a ride. The ride provider system may also support one or more partner services, in which a partner service is directly contacted by a customer, and the partner service then interfaces with the ride provider system in order to supply an autonomous vehicle to the customer. In the former case, a rider trip API may be used for communication and coordination between the customer and the ride provider service.

Figure 6:
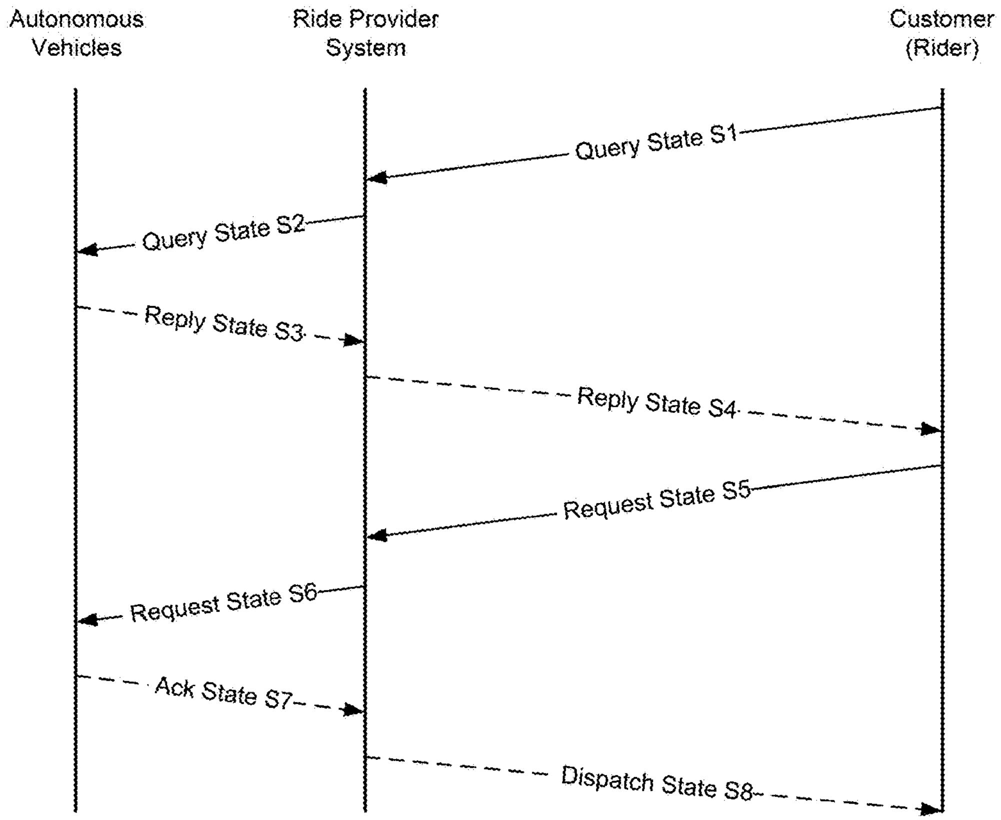
FIG. 6 illustrates an example timing diagram regarding customer and ride provider interaction in accordance with aspects of the technology.
Figure 7A:
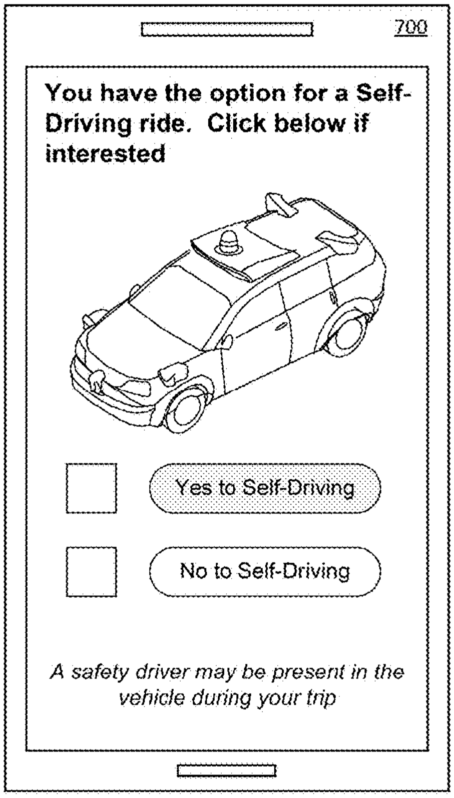
FIGS. 7A-C illustrate example screens of a client device user interface in accordance with aspects of the technology.

FIG. 6 illustrates an example timing diagram 600, which shows how a customer can request and be provided with an autonomous vehicle for a trip. For instance, in this example, as shown by Query State S1, the customer may use an app on his or her phone to request a ride. This can include triggering the propose trip plan 504. By way of example, as seen in view 700 of FIG. 7A, the app may show the customer that they are eligible to have a self-driving vehicle for their ride. Once they accept, he or she submits their request. The request includes a desired pickup location, and may include a destination and one or more stopping points, a pickup time, a destination arrival time, and other information. Also included with the request is an identifier that is associated with the customer, for instance an account number that is associated with a user account stored in a database of the ride provider system or another account database.

By way of example, some or all of this information may be maintained in a trip table. The trip table record for a given customer may be associated with certain information in the user account database, such as the customer's first and last name, contact number and ride preferences, as well as pickup and drop-off locations. In one case, the trip table would contain this information directly, e.g., during a time when a trip has been created and is ongoing. In other cases, the trip table would contain references to rows in other tables that contain the information. For example, the trip table may not contain the user's first/last name directly; rather, it could contain an identifier pointing at a row in a user table.

Returning to FIG. 6, once the ride provider system receives the query, it evaluates availability of one or more vehicles in the fleet. This may include determining whether the vehicles are in or out of service, currently on a trip, relative proximity to the pickup location, and other factors including the customer's preference(s). As part of this, it may issue queries to one or more vehicles, or check the vehicles' status in a database, at Query State S2. Responses may be received from the vehicles or database at Reply State S3. At this stage in the process, the ride provider system may directly or indirectly execute billing-related logic in order to estimate a fare. By way of example, the system may determine a fare based on vehicle availability, pickup location, destination, length of trip (in time or miles) and/or other criteria. In another example, the system may query a billing module (or separate billing system) to provide the estimate.

In Reply State S4 according to the propose trip plan API (e.g., including the Trip Plan message), the ride provider system may indicate the availability of one or more vehicles, as well as information regarding the pickup and drop-off locations (e.g., using the Trip message). For instance, as noted above, an autonomous vehicle may or may not be able to satisfy a request for a particular location for various reasons, including current or expected traffic conditions, road configuration, vehicle ingress or egress relative to the side of the road, wheelchair accessibility, customer preferences, etc.

Once the customer receives the reply per Reply State S4, he or she may accept or decline the response (e.g., via the create trip API or cancel trip API), or make further modifications to the trip request (e.g., another propose trip plan action). Thus, states S1-S4 may repeat one or more times. Then at Request State S5, the customer has accepted any modifications and client device communicates to the ride provider system to send a vehicle (e.g., via the create trip API). At this point, the ride provider system issues a request or other command to a selected vehicle at Request State S6, with the information necessary for the vehicle to conduct the trip. This can include the customer's name, nickname or other identifier, for instance so that the vehicle can greet the customer at pickup or otherwise communicate during the trip and/or arrival at the destination. The selected vehicle confirms acceptance of the ride via Ack State S7.

Figure 7B:
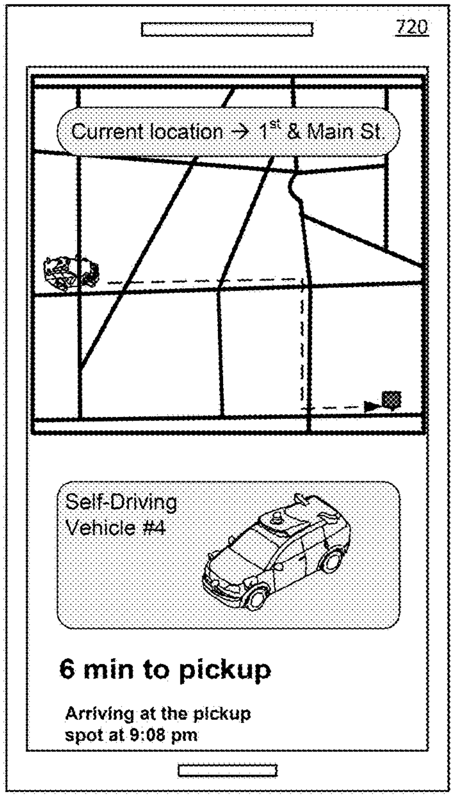
Figure 7C:
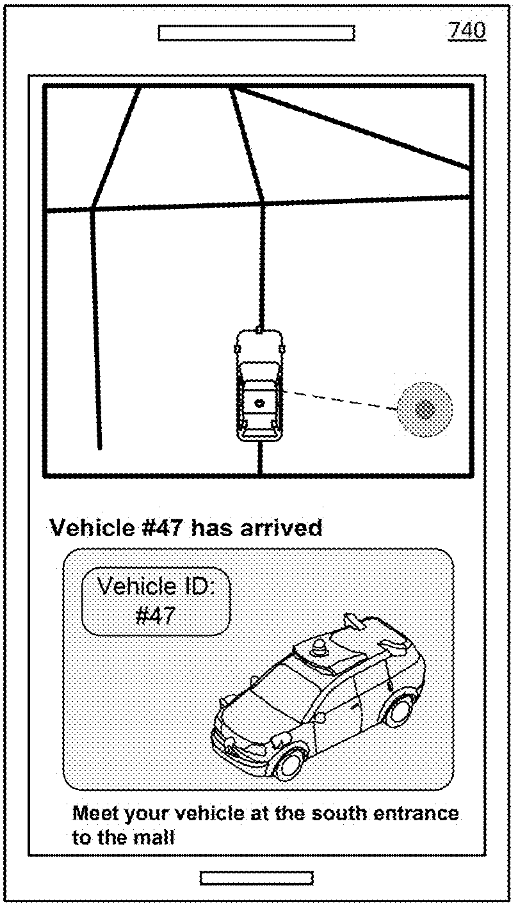

At this point the vehicle will either initiate the ride or will schedule the ride for a future time, for instance when it has completed a current trip with another customer, or based upon the desired pickup or drop-off time. At Dispatch State S8, the ride provider system communicates information about the trip initiation to the customer, e.g., in conjunction with the get trip API, using the Trip Status message, etc. As shown in view 720 of FIG. 7B, the app on the customer's device may indicate the current location of the vehicle relative to the pickup point, an estimated arrival time, and other trip-related information. And once the vehicle arrives, identifying information about the vehicle and/or pickup location may be provided on the app, as shown in view 740 of FIG. 7C.

As noted above, an alternative scenario occurs when the ride provider system supports one or more partner services. Here, a given partner service would be directly contacted by a customer, and the partner service interfaces with the ride provider system in order to supply an autonomous vehicle to the customer. In this case, a partner trip API may be used for communication and coordination between the customer, partner service, and the ride provider service.

Figure 8:
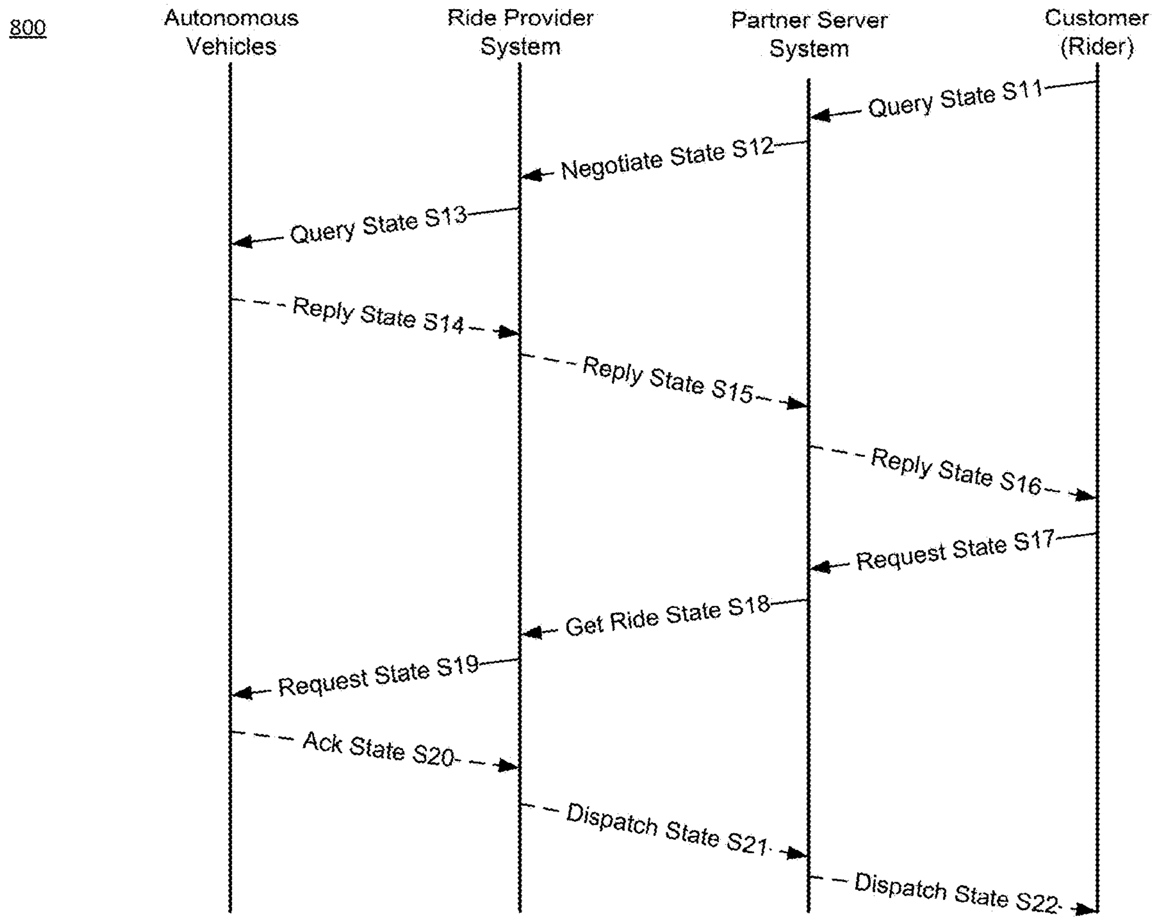
FIG. 8 illustrates an example timing diagram regarding customer, partner and ride provider interaction in accordance with aspects of the technology.

FIG. 8 illustrates an example timing diagram 800, which shows the overall approach for how a customer can request and be provided with an autonomous vehicle for a trip when there is a partner service involved. For instance, in this example, as shown by Query State S11, the customer may use an app on his or her phone to request a ride from the partner server system. The app may operate in the manner shown and discussed above regarding FIGS. 7A-C. In one scenario, the client-side app makes no distinction between vehicle provisioning directly with the ride provider system and vehicle provisioning when the partner service is involved.

When the partner server system receives the client request as part of the query state S11, the partner server system initiates a Negotiation State S12 with the ride provider system. This can include triggering the propose trip plan 504. Upon receipt of a request from the partner server system, the ride provider system evaluates availability of one or more vehicles in the fleet. This may include determining whether the vehicles are in or out of service, currently on a trip, relative proximity to the pickup location, and other factors including the customer's preference(s). As part of this, it may issue queries to one or more vehicles, or check the vehicles' status in a database, at Query State S13. Responses may be received from the vehicles or database at Reply State S14.

In Reply State S15 according to the propose trip plan API (e.g., including the Trip Plan message), the ride provider system may indicate to the partner server system the availability of one or more vehicles, as well as information regarding the pickup and drop-off locations (e.g., using the Trip message). For instance, as noted above, an autonomous vehicle may or may not be able to satisfy a request for a particular location for various reasons, including current or expected traffic conditions, road configuration, vehicle ingress or egress relative to the side of the road, wheelchair accessibility, customer preferences, etc. The partner server system may evaluate this information, for instance in view of what non-autonomous vehicles it could provide to the customer. At Reply State S16, the partner server system provides the customer with one or more trip options.

Once the customer receives the reply per Reply State S16, he or she may accept or decline the response (e.g., via the create trip API or cancel trip API), or make further modifications to the trip request in the manner described above for a customer-ride provider system interaction (e.g., another propose trip plan action). Thus, states S11-S16 may repeat one or more times. Then at Request State S17, the customer has accepted any modifications and client device communicates to the partner server system to send a vehicle (e.g., via the create trip API). Here, if the request can be serviced by an autonomous vehicle, the partner server system enters the Get Ride State S18, in which it requests that the ride provider system dispatch an autonomous vehicle for the customer's trip. Alternatively, if the request is to be serviced by a manually-driven vehicle, then the partner server system may perform vehicle selection and dispatch without further communication with the ride provider system.

When the ride provider system receives the dispatch request from the partner server system at the Get Ride State S18, the ride provider system issues a request or other command to a selected vehicle at Request State S19, with the information necessary for the vehicle to conduct the trip. This can include the customer's name, nickname or other identifier, for instance so that the vehicle can greet the customer at pickup or otherwise communicate during the trip and/or arrival at the destination. The selected vehicle confirms acceptance of the ride via Ack State S20. At this point the vehicle will either initiate the ride or will schedule the ride for a future time, for instance when it has completed a current trip with another customer, or based upon the desired pickup or drop-off time. At Dispatch State S21, the ride provider system communicates information about the trip initiation to the partner server system, e.g., in conjunction with the get trip API, using the Trip Status message, etc. Information about the trip is then provided by the partner server system to the customer in Dispatch State S22.

While not shown in FIGS. 6 and 8, as noted above the customer is able to provide feedback about the trip (either during or after) via the create trip feedback API, e.g., including the Trip Feedback message. The Partner User message and/or the Phone Number message may be employed when contacting the customer. The other messages described above may be incorporated into one or more of the API processes, for instance to communicate identifying information about the vehicle or driver (if present), the route, and other aspects of the trip.

Although the overall process flow for the rider trip API (FIG. 6) and the overall process flow for the partner trip API (FIG. 8) are similar, there are aspects of the ride provider and partner interactions that can provide more robust information to the partner server system that the partner server system may normally have. For instance, API operations estimate duration to pickup 502 and propose trip plan 504 may be implemented as API calls by the partner server system to the ride provider system, where the ride provider system returns an estimate of how long it would take for a vehicle to get to a pickup point. And as noted above, propose trip plan 504 may enable negotiation of pickup and drop-off points that differ from what the partner server system requests. These API calls may be made with or without an actual customer request. In particular, the partner server system may issue such calls in Negotiate State S12, even though there is no incoming customer request. This may be done so that the partner server system knows in real time or near real time (e.g., the information is no more than 5-10 minutes old) whether an autonomous vehicle can service a pickup at a given location at a particular time. This could be done in anticipation of a service need, such as during rush hour or before or after a show, concert or sporting event.

One distinction between the rider trip API and the partner trip API is that in the former case, the customer has or sets up an account with the ride provider system. In this case, the trip database of the ride provider system may maintain trip tables regarding service requests from actual customers. In contrast, when interactions with customers are done via the partner server system, there may be no account set up by an actual customer with the ride provider system. In this scenario, the ride provider system may create a set of non-customer accounts, or may alternatively support partner users directly without utilizing non-customer accounts.

For instance, a set of non-customer accounts may be set up and curated by the ride provider system, for instance with the trip server module using such information to manage one or more partner trip tables in the trip database. In one example, non-customer accounts are not associated with a real customer and include information entirely maintained within the ride provider system. As such, these accounts are automatically authenticated. The non-customer accounts may be created as needed, or a set may be created and maintained for a specific period of time or for an indeterminate timeframe.

According to one scenario, a particular non-customer account may be associated with one partner organization (a third party ridesharing or ride-hailing company), an account number, and lease information. The account number may be a unique reference to the particular non-customer account. The lease information may be used to indicate whether the non-customer account is actively associated with a current or planned trip. More generally, the lease information indicates whether a given non-customer account has been temporarily associated with a specific, real end user (who is identified by, e.g., first/last name and their phone number). This can include an indicator for how long the lease is valid until. Throughout the trip creation flow described above, a single non-customer account is used to act on behalf of the currently active real end user.

The non-customer accounts are used to request and manage trips on behalf of the partner organization. The ride provider system may evaluate one or more non-customer accounts of the set of accounts to determine whether that account is or is not actively associated with a trip. This may be done by issuing a "Get Active Trip" remote procedure call to the one or more accounts, which can return "true" (yes, actively associated with a trip) or "false" (no, not actively associated with a trip).

If one account is actively associated with a trip, then the system looks for another account that is not actively associated with a trip. Once a given account is identified that is not actively associated with a trip, the system "leases" the account for purposes of a new trip. A lease ties the non-customer account to a partner organization until some time T, or until a trip is created. By tying the account to the partner organization, the ride provider system can manage API requests from the partner even when there is no actual customer requesting a ride. In one example, time T may be, e.g., 30 seconds, 5 or 10 minutes, no more than 30 minutes, etc. If a given account is leased, then it is considered "locked" for use with the partner organization until time T is reached or some other criteria is met. During this phase, should a trip be booked with a customer via the partner server system, the leased non-use account is associated with the trip in the trip database, for instance in a non-partner trip table.

Customers that directly arrange for a ride with the ride provider system (e.g., using the rider trip API) have accounts associated with them. Such accounts would typically be associated with billing records, and a billing system that may or may not be part of the ride provider system would handle billing for trips provided by the ride provider system's autonomous vehicles. In contrast, when the customer arranges for a ride via a partner service, as noted above a non-customer account is used by the ride provider system. In this case, the ride provider system and third party partner service may arrange for a fee to provide the customer with the trip, and the partner service may bill the customer according to its own billing system separate from the rider provide system's. By way of example, the partner service may be responsible for direct billing of their riders, while the ride provider system invoices the partner separately. Alternative approaches may also be used. For instance, the ride provider system could directly bill the riders, even though they would be customers of the partner service. This may involve secure sharing of payment information between the partner company and the ride provider system.

In the situation where a customer has arranged for a ride using an autonomous vehicle via a partner service (e.g., using the partner trip API), even though a non-customer account is used within the ride provider system to handle the trip, certain information about the customer may be provided to the ride provider system from the partner server system. In particular, at least the customer's contact information (e.g., mobile phone number and/or email address) may be provided. The customer's preferences and name may also be provided. This information may be associated with the trip record for the duration of the trip. By way of example, once the customer has entered the vehicle and before arriving at the destination, the ride provider system may be able to communicate with the customer. This might be done directly, or indirectly via the partner server system. In one scenario, the partner trip API would enable the customer to communicate with remote assistance personnel of the ride providers via a request callback support message, and allow the customer to provide feedback about the ride via a create trip feedback message. In addition to features available to the customer via the trip API, the customer within the vehicle would also be able to open doors (when stopped), roll down the windows, adjust the music volume, press a "Go" button in the vehicle (either a physical button or on-screen icon) when they are ready to start the ride, etc.

Finally, as noted above, the technology is applicable for various types of vehicles capable of transporting passengers, including sedans, minivans, buses, RVs, motorcycles and the like. It may also be applicable to package transport and delivery using cargo trucks, delivery vans, and the like. By way of example, the API may also be employed with delivery partners (e.g., food, package and/or bulk cargo delivery), for concierge services (e.g., a hotel or medical provider) and the like.

For instance, the messages and communication flows of the API provide the ability to indicate requirements on the vehicle, e.g., ability to carry parcels or larger cargo of a certain size/weight. However, this information need not be conveyed in the API itself. Thus, if a given partner only handles parcel deliveries, then this type of information could be part of that partner's account configuration. Regardless, the system would determine whether a vehicle from the ride provider's ride hailing fleet could be used for the trip or whether a cargo-specific autonomous vehicle would need to be sent. The API may also provide the ability to indicate size and weight of parcels or cargo to be delivered. This could allow the autonomous ride provider to automatically handle multiple delivery trips to be serviced with the same vehicle, such as until the vehicle has been "filled". The information could also be used for billing purposes, such as based on package weight, size, type (e.g., perishable foods, fresh-cut flowers, previous materials such as jewelry, etc.)

Another aspect of the API that can be employed in any of the scenarios discussed herein is the ability to specify multiple stops. For example, a partner that wants to pick up packages from a warehouse and drop them at multiple locations, or a partner that wants to pick up from multiple locations and bring them to a central depot, can use the API including the Waypoint message or Waypoint status message to identify one or more interim stops, as well as when the vehicle is expected to arrive at those stops.

A further aspect of the technology is the ability to schedule a trip ahead of time, possibly on a recurring basis. For example, for a partner that always wants packages to be picked up at a certain time of day can arrange this ahead of time. This might be a convenience for the partner, but it would allow the ride provider system to schedule vehicles differently, e.g., on an hourly, daily, or weekly basis.

Yet another aspect that is applicable to delivery-type services is the ability to attach information to the request, such as a "packing slip" or other description of what is being sent. This information may not be utilized by the ride provider system, but would be stored just for the convenience of the API user or the recipient of a package.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method, comprising:

receiving, by one or more first processors of a ride provider system from one or more second processors of a partner server system, a query regarding availability of a fleet of autonomous vehicles to service a trip from a pickup location to a destination, wherein the one or more first processors of the ride provider system are configured to communicate with the fleet of autonomous vehicles, the one or more second processors of the partner server system, and one or more client computing devices, wherein the one or more second processors of the partner server system are configured to communicate with the ride provider system and the one or more client computing devices, and wherein the partner server system is not in direct communication with the fleet of autonomous vehicles;

responsive to the query from the one or more second processors of the partner server system:

evaluating, by the one or more first processors of the ride provider system, availability of one or more autonomous vehicles of the fleet of autonomous vehicles to service the trip;

providing, by the one or more first processors of the ride provider system to the one or more second processors of the partner server system, a reply indicating whether at least one of the one or more autonomous vehicles is available to service the trip, wherein the reply is based on evaluating the availability of the one or more autonomous vehicles; and prior to providing the reply, generating, by the one or more first processors of the ride provider system based on evaluating the availability of the one or more autonomous vehicles, a proposed trip token including at least one waypoint for the trip and having a specified time limit;

subsequent to providing the reply, receiving, by the one or more first processors of the ride provider system from the one or more second processors of the partner server system, a dispatch request for the trip; and responsive to the dispatch request, causing, by the one or more first processors of the ride provider system based on the dispatch request, an autonomous vehicle selected from the one or more autonomous vehicles to navigate, in an autonomous driving mode, to the pickup location.

2. The method of claim 1, wherein the evaluating includes at least one of issuing queries to the one or more autonomous vehicles or determining a status of the one or more autonomous vehicles based on stored status information.

3. The method of claim 1, wherein the reply includes the proposed trip token.

4. The method of claim 1, further comprising, prior to causing the autonomous vehicle to navigate to the pickup location, issuing, by the one or more first processors of the ride provider system, dispatch information to the one or more second processors of the partner server system, the dispatch information including identifying information regarding the autonomous vehicle and an estimated arrival time at the pickup location.

5. The method of claim 1, wherein the reply includes at least one of an alternative pickup location, an alternative destination, or an alternative pickup time.

6. The method of claim 1, further comprising executing, by the one or more first processors of the ride provider system, billing logic to generate a fee estimate for the trip upon receiving the query.

7. The method of claim 1, further comprising assigning, by the one or more first processors of the ride provider system, a non-customer account to the trip, wherein the non-customer account is not associated with an actual customer of the ride provider system and is maintained by the ride provider system.

8. The method of claim 7, further comprising associating the non-customer account to a customer to be picked up at the pickup location.

9. A ride provider system, comprising:

one or more first processors configured to:

communicate with the fleet of autonomous vehicles, one or more second processors of a partner server system, and one or more client computing devices, wherein the one or more second processors of the partner server system are configured to communicate with the ride provider system and the one or more client computing devices, and wherein the partner server system is not in direct communication with the fleet of autonomous vehicles;

receive a query from the one or more second processors of the partner server system regarding availability of the fleet of autonomous vehicles to service a trip from a pickup location to a destination;

responsive to the query:

evaluate availability of one or more autonomous vehicles of the fleet of autonomous vehicles to service the trip;

provide, to the one or more second processors of the partner server system, a reply indicating whether at least one of the one or more autonomous vehicles is available to service the trip, wherein the reply is based on the evaluation of the availability of the one or more autonomous vehicles; and prior to providing the reply, generate, based on the evaluation of the availability of the one or more autonomous vehicles, a proposed trip token including at least one waypoint for the trip and having a specified time limit;

receive, from the one or more second processors of the partner server system, a dispatch request for the trip; and cause, based on the dispatch request, an autonomous vehicle selected from the one or more autonomous vehicles to navigate, in an autonomous driving mode, to the pickup location.

10. The ride provider system of claim 9, wherein the evaluation of the availability of the one or more autonomous vehicles includes at least one of issuance queries to the one or more autonomous vehicles or determination a status of the one or more autonomous vehicles based on stored status information.

11. The ride provider system of claim 9, wherein the reply includes the proposed trip token.

12. The ride provider system of claim 9, wherein the one or more first processors are further configured to issue dispatch information to the one or more second processors of the partner server system, the dispatch information including identifying information regarding the autonomous vehicle and an estimated arrival time at the pickup location.

13. The ride provider system of claim 9, wherein the reply includes at least one of an alternative pickup location, an alternative destination, or an alternative pickup time.

14. The ride provider system of claim 9, wherein the one or more first processors are further configured to execute billing logic to generate a fee estimate for the trip upon receiving the query.

15. The ride provider system of claim 9, wherein the one or more first processors are further configured to:

assign a non-customer account to the trip, wherein the non-customer account is not associated with an actual customer of the ride provider system; and maintain the non-customer account.

16. The ride provider system of claim 15, wherein the one or more first processors are further configured to associate the non-customer account to a customer to be picked up at the pickup location.

17. The ride provider system of claim 9, further including a trip database configured to maintain one or more trip tables for trips serviced by the fleet of autonomous vehicles, the trip database operatively coupled the one or more first processors.

18. The ride provider system of claim 9, wherein the partner server system is associated with a fleet of non-autonomous vehicles.

19. The method of claim 1, wherein the partner server system is associated with a fleet of non-autonomous vehicles.

20. A method, comprising:

receiving, by one or more first processors of a ride provider system from one or more second processors of a partner server system, a query regarding availability of a fleet of autonomous vehicles to service a trip from a pickup location to a destination, wherein the one or more first processors of the ride provider system are configured to communicate with the fleet of autonomous vehicles, the one or more second processors of the partner server system, and one or more client computing devices, wherein the one or more second processors of the partner server system are configured to communicate with the ride provider system and the one or more client computing devices, and wherein the partner server system is not in direct communication with the fleet of autonomous vehicles;

responsive to the query from the one or more second processors of the partner server system:

evaluating, by the one or more first processors of the ride provider system, availability of one or more autonomous vehicles of the fleet of autonomous vehicles to service the trip; and providing, by the one or more first processors of the ride provider system to the one or more second processors of the partner server system, a reply indicating whether at least one of the one or more autonomous vehicles is available to service the trip, wherein the reply is based on evaluating the availability of the one or more autonomous vehicles;

subsequent to providing the reply, receiving, by the one or more first processors of the ride provider system from the one or more second processors of the partner server system, a dispatch request for the trip;

responsive to the dispatch request, causing, by the one or more first processors of the ride provider system based on the dispatch request, an autonomous vehicle selected from the one or more autonomous vehicles to navigate, in an autonomous driving mode, to the pickup location; and assigning, by the one or more first processors of the ride provider system, a non-customer account to the trip, wherein the non-customer account is not associated with an actual customer of the ride provider system and is maintained by the ride provider system.

21. A ride provider system, comprising:

one or more first processors configured to:

communicate with the fleet of autonomous vehicles, one or more second processors of a partner server system, and one or more client computing devices, wherein the one or more second processors of the partner server system are configured to communicate with the ride provider system and the one or more client computing devices, and wherein the partner server system is not in direct communication with the fleet of autonomous vehicles;

receive a query from the one or more second processors of the partner server system regarding availability of the fleet of autonomous vehicles to service a trip from a pickup location to a destination;

responsive to the query:

evaluate availability of one or more autonomous vehicles of the fleet of autonomous vehicles to service the trip; and provide, to the one or more second processors of the partner server system, a reply indicating whether at least one of the one or more autonomous vehicles is available to service the trip, wherein the reply is based on the evaluation of the availability of the one or more autonomous vehicles;

receive, from the one or more second processors of the partner server system, a dispatch request for the trip;

cause, based on the dispatch request, an autonomous vehicle selected from the one or more autonomous vehicles to navigate, in an autonomous driving mode, to the pickup location;

assign a non-customer account to the trip, wherein the non-customer account is not associated with an actual customer of the ride provider system; and maintain the non-customer account.

* * * * *